(12) United States Patent
Boeckh et al.

(10) Patent No.: US 7,999,035 B2
(45) Date of Patent: Aug. 16, 2011

(54) AMPHIPHILIC WATER-SOLUBLE ALKOXYLATED POLYALKYLENIMINES WITH AN INTERNAL POLYETHYLENE OXIDE BLOCK AND AN EXTERNAL POLYPROPYLENE OXIDE BLOCK

(75) Inventors: Dieter Boeckh, Limburgerhof (DE); Christian Bittner, Bensheim (DE); Andrea Misske, Speyer (DE); Arturo Luis Casado Dominguez, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 560 days.

(21) Appl. No.: 11/911,590

(22) PCT Filed: Apr. 12, 2006

(86) PCT No.: PCT/EP2006/061552
§ 371 (c)(1),
(2), (4) Date: Oct. 15, 2007

(87) PCT Pub. No.: WO2006/108856
PCT Pub. Date: Oct. 19, 2006

(65) Prior Publication Data
US 2008/0153983 A1    Jun. 26, 2008

Related U.S. Application Data

(60) Provisional application No. 60/671,493, filed on Apr. 15, 2005.

(51) Int. Cl.
C08L 53/00 (2006.01)
C08G 73/00 (2006.01)
C08G 73/04 (2006.01)

(52) U.S. Cl. .............................. 525/96; 525/88; 528/422

(58) Field of Classification Search .................... 525/96, 525/88; 528/422
See application file for complete search history.

(56) References Cited

U.S. PATENT DOCUMENTS 4,076,497 A   2/1978   Freyberg et al.
5,565,145 A   10/1996  Watson et al.

FOREIGN PATENT DOCUMENTS

| DE | 2 227 546 | 1/1974 |
|---|---|---|
| EP | 0 359 034 | 3/1990 |
| JP | 2003 020585 | 1/2003 |
| JP | 2008534727 | 8/2008 |
| JP | 2008537974 | 10/2008 |
| WO | 99 01530 | 1/1999 |
| WO | 99 67352 | 12/1999 |
| WO | 00 32727 | 6/2000 |
| WO | WO 2006/108857 A1 | 10/2006 |
| WO | WO 2006/113315 A2 | 10/2006 |

*Primary Examiner* — Duc Truong
(74) *Attorney, Agent, or Firm* — Oblon, Spivak, McClelland, Maier & Neustadt, L.L.P.

(57) ABSTRACT

Amphiphilic water-soluble alkoxylated polyalkylenimines of the general formula I

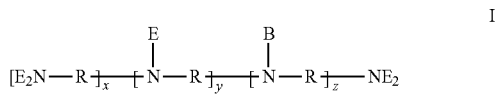

in which the variables are each defined as follows:
R are identical or different, linear or branched $C_2$-$C_6$-alkylene radicals;
B is a branch;
E is an alkylenoxy unit of the formula

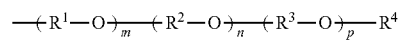

$R^1$ is 1,2-propylene, 1,2-butylene and/or 1,2-isobutylene;
$R^2$ is ethylene;
$R^3$ is 1,2-propylene;
$R^4$ are identical or different radicals: hydrogen; $C_1$-$C_4$-alkyl;
x, y, z are each from 2 to 150, where the sum of x+y+z means a number of alkylenimine units which corresponds to an average molecular weight $M_w$ of the polyalkylenimine before the alkoxylation of from 300 to 10 000;
m is a rational number from 0 to 2;
n is a rational number from 6 to 18;
p is a rational number from 3 to 12, where $0.8 \leq n/p \leq 1.0(x+y+z)^{1/2}$;
and quaternization products thereof.

9 Claims, No Drawings

AMPHIPHILIC WATER-SOLUBLE ALKOXYLATED POLYALKYLENIMINES WITH AN INTERNAL POLYETHYLENE OXIDE BLOCK AND AN EXTERNAL POLYPROPYLENE OXIDE BLOCK

The present invention relates to novel amphiphilic water-soluble alkoxylated polyalkylenimines of the general formula I

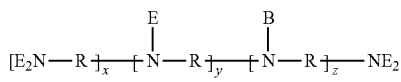

in which the variables are each defined as follows:
R are identical or different, linear or branched $C_2$-$C_6$-alkylene radicals;
B is a branch;
E is an alkylenoxy unit of the formula

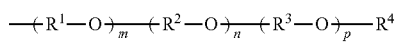

$R^1$ is 1,2-propylene, 1,2-butylene and/or 1,2-isobutylene;
$R^2$ is ethylene;
$R^3$ is 1,2-propylene;
$R^4$ are identical or different radicals: hydrogen; $C_1$-$C_4$-alkyl;
x, y, z are each from 2 to 150, where the sum of x+y+z means a number of alkylenimine units which corresponds to an average molecular weight $M_w$ of the polyalkylenimine before the alkoxylation of from 300 to 10 000;
m is a rational number from 0 to 2;
n is a rational number from 6 to 18;
p is a rational number from 3 to 12, where $0.8 \leq n/p \leq 1.0(x+y+z)^{1/2}$;
and quaternization products thereof.

In addition to surfactants, polymers are also used as soil detachment-promoting additives for laundry detergents and cleaning compositions. The known polymers are very suitable, for example, as dispersants of soil pigments such as clay minerals or soot, and as additives which prevent the reattachment of already detached soil. Such dispersants are, though, especially at low temperatures, substantially ineffective in the removal of greasy soil from the surfaces.

WO-A-99/67352 describes dispersants for hydrophobic soil which are compatible with peroxidic bleaches, are said to prevent the resettling of the greasy soil detached in the course of washing onto the cleaned textile and are based on alkoxylated polyethylenimines which have an inner polypropylene oxide block and an outer, distinctly larger polyethylene oxide block.

U.S. Pat. No. 5,565,145 recommends, as dispersants for nonpolar particulate soil, uncharged alkoxylated polyethylenimines which may contain up to 4 propylene oxide units per active NH group bonded directly to the nitrogen atom. However, preferred and demonstrated by way of example are polyethylenimines which are exclusively ethoxylated or at most incipiently propoxylated, i.e. not more than 1 mol of propylene oxide per NH group.

These alkoxylated polyethylenimines too are good dispersants for hydrophilic soil pigments, but do not show a satisfactory wash result in the case of greasy stains.

Polyethylenimines which have an inner polyethylene oxide block and an outer polypropylene oxide block are yet to be used in laundry detergents or cleaning compositions.

U.S. Pat. No. 4,076,497 discloses the use of initially ethoxylated and then propoxylated polyethylenimines which have been reacted in total with 30 mol of alkylene oxide, including at least 15 mol of propylene oxide, per mole of active NH group as assistants for the dyeing of polyester and cellulose fibers with dispersion dyes. However, the alkylenoxy chains of the inventive polyalkylenimines contain at most 12 propylenoxy units.

DE-A-22 27 546 describes, as well as polyethylenimines which have the reverse alkylene oxide sequence, also polyethylenimines which have initially been ethoxylated and then propoxylated as breakers for crude oil emulsions. However, in comparison to the inventive polyalkylenimines, these polyethylenimines have too high a total degree of alkoxylation of at least 105 mol of alkylene oxide per mole of alkoxylatable NH group and too high a molar ratio of propylene oxide to ethylene oxide of from 1.9 to 4:1 (or conversely too small a molar ratio of ethylene oxide to propylene oxide of from 0.53 to 0.25).

JP-A-2003-020585 describes the use of alkoxylated polyethylenimines in deinking processes. As well as polyethylenimines which are preferably exclusively ethoxylated or else initially ethoxylated and then alkoxylated randomly with an ethylene oxide/propylene oxide mixture, a product is also disclosed which is based on a polyethylenimine of average molecular weight $M_w$ 600 and has been reacted initially with 100 mol of ethylene oxide and then with 100 mol of propylene oxide per mole of alkoxylatable NH group and thus likewise with a very much larger amount of alkylene oxide than in the case of the inventive polyethylenimines.

Finally, EP-A-359 034 discloses assistants for the preparation and stabilization of nonaqueous pigment dispersions which are based on at least two polyethylenimines comprising polyalkylene oxide blocks. When polyethylenimines which have an outer block of a higher alkylene oxide are used, they are always initially ethoxylated and then butoxylated compounds, some of which contain a small intermediate polypropylene oxide block. Polyethylenimines which have an inner polyethylene oxide block and an outer polypropylene oxide block are always additionally reacted with at least one mol per mole of active NH group of an α-olefin oxide (α-$C_{12}$/$C_{14}$-, $C_{16}$/$C_{18}$- or $C_{20}$-$C_{28}$-olefin oxide).

It is an object of the invention to provide polymers which are suitable as an additive to laundry detergents and cleaning compositions for removing greasy soil from textile and hard surfaces. In particular, the polymers should also exhibit good greasy soil-detaching action even at low washing temperatures.

Accordingly, amphiphilic water-soluble alkoxylated polyalkylenimines of the general formula I

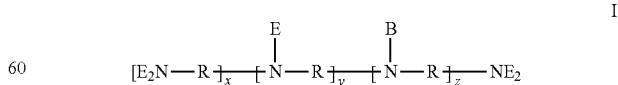

in which the variables are each defined as follows:
R are identical or different, linear or branched $C_2$-$C_6$-alkylene radicals;
B is a branch;
E is an alkylenoxy unit of the formula

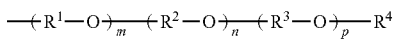

$R^1$ is 1,2-propylene, 1,2-butylene and/or 1,2-isobutylene;
$R^2$ is ethylene;
$R^3$ is 1,2-propylene;
$R^4$ are identical or different radicals: hydrogen; $C_1$-$C_4$-alkyl;
x, y, z are each from 2 to 150, where the sum of x+y+z means a number of alkylenimine units which corresponds to an average molecular weight $M_w$ of the polyalkylenimine before the alkoxylation of from 300 to 10 000;
m is a rational number from 0 to 2;
n is a rational number from 6 to 18;
p is a rational number from 3 to 12, where $0.8 \leq n/p \leq 1.0(x+y+z)^{1/2}$;
and quaternization products thereof have been found.

An essential property of the inventive alkoxylated polyalkylenimines is their amphiphilicity, i.e. they have a balanced ratio of hydrophobic and hydrophilic structural elements and are thus firstly hydrophobic enough to absorb on greasy soil and to remove them together with the surfactants and the remaining washing components of the laundry detergents and cleaning compositions, but secondly also hydrophilic enough to keep the detached greasy soil in the washing and cleaning liquor and prevent it from resettling on the surface.

This effect is achieved by the alkoxylated polyalkylenimines having an inner polyethylene oxide block and an outer polypropylene oxide block, the degree of ethoxylation and the degree of propoxylation not going above or below specific limiting values, and their ratio being at least 0.8 and within a range whose upper limit according to the empirically found relationship $n/p \leq 1.0(x+y+z)^{1/2}$ is determined by the molecular weight of the polyalkylenimine used.

The inventive alkoxylated polyalkylenimines have a basic skeleton which comprises primary, secondary and tertiary amine nitrogen atoms which are joined by alkylene radicals R and are in the form of the following moieties in random arrangement:

primary amino moieties which terminate the main chain and the side chains of the basic skeleton and whose hydrogen atoms are subsequently replaced by alkylenoxy units:

secondary amino moieties whose hydrogen atom is subsequently replaced by alkylenoxy units:

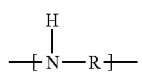

tertiary amino moieties which branch the main chain and the side chains:

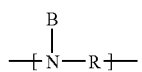

Before the alkylation, the polyalkylenimine has an average molecular weight $M_w$ of from 300 to 10 000. The sum x+y+z of the repeating units of the primary, secondary and tertiary amino moieties means a total number of alkylenimine units which corresponds to these molecular weights.

The molecular weight $M_w$ of the polyalkylenimine is preferably from 500 to 7500 and more preferably from 1000 to 6000.

The R radicals connecting the amine nitrogen atoms may be identical or different, linear or branched $C_2$-$C_6$-alkylene radicals. A preferred branched alkylene is 1,2-propylene. A particularly preferred alkylene radical R is ethylene.

Since cyclizations are possible in the formation of the basic polyalkylenimine skeleton, it is also possible for cyclic amino moieties to be present to a small extent in the basic skeleton and they are of course alkoxylated in the same way as the noncyclic primary and secondary amino moieties.

The hydrogen atoms of the primary and secondary amino groups of the basic polyalkylenimine skeleton are replaced by alkylenoxy units of the formula

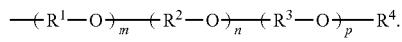

In this formula, the variables are each defined as follows:
$R^1$ is 1,2-propylene, 1,2-butylene and/or 1,2-isobutylene, preferably 1,2-propylene;
$R^2$ is ethylene;
$R^3$ is 1,2-propylene;
$R^4$ is hydrogen or $C_1$-$C_4$-alkyl, preferably hydrogen;
m is a rational number of 0 to 2; when m≠0, preferably about 1;
n is a rational number from 6 to 18;
p is a rational number from 3 to 12, where $0.8 \leq n/p \leq 1.0(x+y+z)^{1/2}$.
n and p are preferably defined as follows:
n is a rational number from 7 to 15;
p is a rational number from 4 to 10, where $0.9 \leq n/p \leq 0.8(x+y+z)^{1/2}$.
n and p are more preferably each defined as follows:
n is a rational number from 8 to 12;
p is a rational number from 5 to 8, where $1.0 \leq n/p \leq 0.4(x+y+z)^{1/2}$.

The substantial part of these alkylenoxy units is formed by the ethylenoxy units —($R^2$—O)$_n$— and the propylenoxy units —($R^3$—O)$_p$—.

The alkylenoxy units may additionally also have a small proportion of propylenoxy or butylenoxy units —($R^1$—O)$_m$—, i.e. the polyalkylenimine may be reacted initially with small amounts of up to 2 mol, especially from 0.5 to 1.5 mol, in particular from 0.8 to 1.2 mol, of propylene oxide or butylene oxide per mole of NH moiety present, i.e. incipiently alkoxylated.

This modification of the polyalkylenimine allows, if necessary, the viscosity of the reaction mixture in the alkoxylation to be lowered. However, the modification generally does not influence the performance properties of the alkoxylated polyalkylenimine and therefore does not constitute a preferred measure.

The inventive alkoxylated polyalkylenimines may also be quaternized. A suitable degree of quaternization is up to 50%, in particular from 5 to 40%. The quaternization is effected preferably by introducing $C_1$-$C_4$-alkyl groups and may be undertaken in a customary manner by reaction with corresponding alkyl halides and dialkyl sulfates.

The quaternization may be advantageous in order to adjust the alkoxylated polyalkylenimines to the particular composition of the laundry detergent and cleaning composition in which they are to be used, and to achieve better compatibility and/or phase stability of the formulation. The alkoxylated polyalkylenimines are preferably not quaternized.

The inventive alkoxylated polyalkylenimines may be prepared in a known manner.

One preferred procedure consists in initially undertaking only an incipient alkoxylation of the polyalkylenimine in a first step.

In this step, the polyalkylenimine is reacted only with a portion of the total amount of ethylene oxide used, which corresponds to about 1 mol of ethylene oxide per mole of NH moiety or, when the polyalkylenimine is to be modified initially with up to 2 mol of propylene oxide or butylene oxide per mole of NH moiety, here too initially only with up to 1 mol of this alkylene oxide.

This reaction is undertaken generally in the absence of a catalyst in aqueous solution at from 70 to 200° C., preferably from 80 to 160° C., under a pressure of up to 10 bar, in particular up to 8 bar.

In a second step, the further alkoxylation is then effected by subsequent reaction i) with the remaining amount of ethylene oxide or, in the case of a modification by higher alkylene oxide in the first step, with the entirety of ethylene oxide and ii) with propylene oxide.

The further alkoxylation is undertaken typically in the presence of a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyalkylenimine and alkylene oxide.

The further alkoxylation may be undertaken in substance (variant a)) or in an organic solvent (variant b)). The process conditions specified below may be used both for the ethoxylation and for the subsequent propoxylation.

In variant a), the aqueous solution of the incipiently alkoxylated polyalkylenimine obtained in the first step, after addition of the catalyst, is initially dewatered. This can be done in a simple manner by heating to from 80 to 150° C. and distilling off the water under a reduced pressure of from 0.01 to 0.5 bar. The subsequent reaction with the alkylene oxide is effected typically at from 70 to 200° C., preferably from 100 to 180° C., and at a pressure of up to 10 bar, in particular up to 8 bar, and a continued stirring time of from about 0.5 to 4 h at from about 100 to 160° C. and constant pressure follows in each case.

Suitable reaction media for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these aprotic solvents. Preferred solvents are xylene and toluene.

In variant b) too, the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the alkoxylated polyalkylenimine is obtained directly in substance and may be converted if desired to an aqueous solution. In variant b), the organic solvent is typically removed and replaced by water. The products may of course also be isolated in substance.

The inventive alkoxylated polyalkylenimines, as a 1% by weight solution in distilled water, have a cloud point of generally $\leq 70°$ C., preferably $\leq 65°$ C. The cloud point is more preferably in the range from 25 to 55° C.

The inventive alkoxylated polyalkylenimines are outstandingly suitable as a soil detachment-promoting additive for laundry detergents and cleaning compositions. They exhibit high dissolving power especially in the case of greasy soil. It is of particular advantage that they display the soil-detaching power even at low washing temperatures.

The inventive alkoxylated polyalkylenimines can be added to the laundry detergents and cleaning compositions in amounts of generally from 0.05 to 10% by weight, preferably from 0.1 to 5% by weight and more preferably from 0.25 to 2.5% by weight, based on the particular overall composition.

In addition, the laundry detergents and cleaning compositions generally comprise surfactants and, if appropriate, further polymers as washing substances, builders and further customary ingredients, for example cobuilders, complexing agents, bleaches, standardizers, graying inhibitors, dye transfer inhibitors, enzymes and perfumes.

EXAMPLES

I. Preparation of Inventive Alkoxylated Polyalkylenimines

Example 1

Incipient Ethoxylation

In a 2 l autoclave, 900 g of a 50% by weight aqueous solution of polyethylenimine 5000 (average molecular weight $M_w$ of 5000) were heated to 80° C. and purged three times with nitrogen up to a pressure of 5 bar. After the temperature had been increased to 90° C., 461 g of ethylene oxide were metered in up to 5 bar. The mixture was stirred at 90° C. under a constant pressure of 5 bar for a further 1 h. Volatile fractions were removed by stripping with nitrogen.

1345 g of a 68% by weight aqueous solution of polyethylenimine 5000 which comprised 1 mol of ethylene oxide per mole of NH bond were obtained.

a) Ethoxylation and Propoxylation in Substance

In a 2 l autoclave, a mixture of 163 g of the aqueous solution obtained in the incipient ethoxylation and 13.9 g of a 40% by weight aqueous potassium hydroxide solution was heated to 70° C. After purging with nitrogen three times up to a pressure of 5 bar, the mixture was dewatered at 120° C. and a reduced pressure of 10 mbar for 4 h. Subsequently, 506 g of ethylene oxide were metered in at 120° C. up to a pressure of 8 bar. The mixture was stirred at 120° C. and 8 bar for 4 h. After decompression and purging with nitrogen, 519 g of propylene oxide were metered in at 120° C. up to a pressure of 8 bar. The mixture was stirred again at 120° C. and 8 bar for a further 4 h. Volatile fractions were removed by stripping with nitrogen.

1178 g of polyethylenimine 5000 which comprised 10 mol of ethylene oxide and 7 mol of propylene oxide per mole of NH bond were obtained in the form of a light brown viscous liquid (amine titer: 0.9276 mmol/g; pH of a 1% by weight aqueous solution: 10.67).

b) Ethoxylation and Propoxylation in Xylene

In a 2 l autoclave, a mixture of 137 g of the aqueous solution obtained in the incipient ethoxylation, 11.8 g of a 40% by weight aqueous potassium hydroxide solution and 300 g of xylene was purged three times with nitrogen up to a pressure of 5 bar. At a jacket temperature of 175° C., the water present was separated out using a water separator supported by a gentle nitrogen stream within 4 h. Subsequently, 428 g of ethylene oxide were metered in at 120° C. up to a pressure of 3 bar. The mixture was stirred at 120° C. under a constant pressure of 3 bar for a further 2 h. 439 g of propylene oxide were then metered in at 120° C. up to a pressure of 3 bar. The mixture was stirred at 120° C. and 3 bar for a further 3 h. After the solvent had been removed under a reduced pressure of 10 mbar, the alkoxylation product was stripped with 4 bar of steam at 120° C. for 3 h.

956 g of polyethylenimine 5000 which comprised 10 mol of ethylene oxide and 7 mol of propylene oxide per mole of NH bond were obtained in the form of a light brown viscous liquid (amine titer: 0.9672 mmol/g; pH of a 1% by weight aqueous solution: 10.69).

Example 2

In a 2 l autoclave, a mixture of 321 g of a 69.2% by weight aqueous solution of polyethylenimine 5000 (1 mol of ethylene oxide per mole of NH bond) which was obtained in incipient ethoxylation analogously to example 1 and 28 g of a 40% by weight aqueous potassium hydroxide solution was heated to 80° C. After it had been purged three times with nitrogen up to a pressure of 5 bar, the mixture was dewatered at 120° C. for 3 h and a vacuum of 10 mbar. Subsequently, 1020 g of ethylene oxide were metered at 120° C. up to a pressure of 8 bar. The mixture was then stirred at 120° C. and 8 bar for a further 4 h. Volatile fractions were removed by stripping with nitrogen.

1240 g of polyethylenimine 5000 which comprised 9.9 mol of ethylene oxide per mole of NH bond were obtained in the form of a brown viscous liquid (amine titer: 1.7763 mmol/g; pH of a 1% by weight aqueous solution: 11.3).

239 g of the ethoxylation product were then, after purging three times with nitrogen up to a pressure of 5 bar, reacted at 120° C. with approx. 87 g of propylene oxide (measurement precision +/−15 g) up to a pressure of 8 bar. The mixture was then stirred at 120° C. and 8 bar for 4 h. Volatile fractions were removed by stripping with nitrogen.

340 g of polyethylenimine 5000 which comprised 9.9 mol of ethylene oxide and 3.5 mol of propylene oxide per mole of NH bond were obtained in the form of a light brown viscous liquid (amine titer: 1.2199 mmol/g; pH of a 1% by weight aqueous solution: 11.05).

Example 3

Incipient Ethoxylation

In a 2 l autoclave, a mixture of 516 g of polyethylenimine 600 (average molecular weight $M_w$ of 600) and 10.3 g of water was flushed three times with nitrogen up to a pressure of 5 bar and heated to 90° C. 528 g of ethylene oxide were then metered in at 90° C. The mixture was stirred at 90° C. under a constant pressure of 5 bar for a further 1 h. Volatile fractions (especially water) were removed by stripping with nitrogen.

1040 g of polyethylenimine 600 which comprised 1 mol of ethylene oxide per mole of NH bond were obtained in the form of a brown liquid.

Ethoxylation and Propoxylation in Substance

In a 2 l autoclave, a mixture of 86 g of the incipiently ethoxylated polyethylenimine 600 and 10.8 g of a 40% by weight aqueous potassium hydroxide solution was heated to 80° C. After it had been purged three times with nitrogen up to a pressure of 5 bar, the mixture was dewatered at 120° C. and a vacuum of 10 mbar for 2.5 h. After the vacuum had been removed with nitrogen, 384 g of ethylene oxide were metered in at 120° C. The mixture was stirred at 120° C. for a further 2 h. After decompression and purging with nitrogen, 393 g of propylene oxide were metered in at 120° C. The mixture was again stirred at 120° C. for a further 2 h. Volatile fractions were removed by stripping with nitrogen.

865 g of polyethylenimine 600 which comprised 10 mol of ethylene oxide and 7 mol of propylene oxide per mole of NH bond were obtained in the form of a light brown viscous liquid (amine titer: 1.0137 mmol/g; pH of a 1% by weight aqueous solution: 11.15).

Example 4

7.3 g of dimethyl sulfate were added dropwise to 300 g of the alkoxylated polyethylenimine 5000 which has been obtained in example 1b) and stirred at 60° C. under nitrogen. In the course of this, the temperature rose to 70° C. After the mixture had been stirred at 70° C. for a further 3 hours, the mixture was cooled to room temperature.

307 g of polyethylenimine 5000, which comprised 10 mol of ethylene oxide and 7 mol of propylene oxide per mole of NH bond and had a degree of quaternization of 22% were obtained in the form of a brown viscous liquid (amine titer: 0.7514 mmol/g).

II. Use of Inventive Alkoxylated Polyalkylenimines in Laundering

To test their soil release performance, the alkoxylated polyalkylenimines were added to the wash liquor in three series of experiments together with the surfactants and builders specified in table 1, as model laundry detergents, or with a commercially available laundry detergent. The test cloths recited in table 2 were then washed under the washing conditions specified in tables 3a, 4a and 5a.

Soil release from the test cloths was determined by subjecting the test cloths to a reflectance measurement at 460 nm before and after the wash. Soil removal was computed from the reflectance values R before and after the wash and also the reflectance value of a white reference cotton fabric by the following formula, in %:

$$\text{Soil removal } [\%] = \frac{R(\text{after wash}) - R(\text{before wash})}{R(\text{white cotton}) - R(\text{before wash})} \times 100$$

All washes were carried out 2×. The soil removal values reported under the wash results in tables 3b, 4b and 5b correspond to the average of the measured values obtained under the same conditions. The values respectively obtained without added polymer are reported for comparison.

All amounts used are based on 100% active substance.

TABLE 1

Surfactants and builder

| | |
|---|---|
| Surfactant 1 | Lutensit ® A-LBN 50 (BASF; linear $C_{12}$-alkylbenzene-sulfonate (Na salt)) |
| Surfactant 2 | Plurafac ® LF 401 (BASF; fatty alcohol alkoxylate) |
| Builder | sodium tripolyphosphate |

TABLE 2

Test cloths

| | |
|---|---|
| TG 1 | Triolein colored with Sudan Red: 0.2 g stain on 5 g white cotton fabric |
| TG 2 | Olive oil colored with Sudan Red; 0.2 g stain on 5 g white cotton fabric |
| TG 3 | WFK 10D (sebum/pigment soil cloth from WFK*) |
| TG 4 | EMPA 118 (sebum/pigment soil cloth from EMPA**) |
| TG 5 | Scientific Services*** Sebum |
| TG 6 | WFK 10PF (vegetable fat/pigment soil cloth from WFK) |
| TG 7 | CFT-CS10 (colored butter on cotton fabric from CFT****) |
| TG 8 | CFT-CS 62 (colored pork fat on cotton fabric from CFT) |

*Research Institute for Cleaning Technology, Krefeld
**Swiss Materials Testing and Research Institute, St. Gallen, CH
***Scientific Services S/D, Inc., Sparrow Bush, NY, USA
****Center for Test Materials BV, Vlaardingen, NL

TABLE 3a

Wash conditions

| | |
|---|---|
| Instrument | Launder-O-Meter (from Atlas, Chicago, USA) |
| Wash temperature | 25° C. |
| Polymer dosage | 30 mg/l |
| Laundry detergent | Model laundry detergent from surfactant 1/builder |
| Surfactant dosage | 300 mg/l |
| Builder dosage | 200 mg/l |
| Water hardness | 2.5 mmol/l Ca:Mg 3:1 |
| Liquor ratio | 12.5:1 |
| Wash time | 30 min |
| Test cloths | TG 1 and TG 2<br>The test cloths were each washed separately with a further 5 g of white cotton fabric per pot. |

TABLE 3b

Wash results

| | Soil removal [%] | |
|---|---|---|
| Polymer | TG 1 | TG 2 |
| from Example 3 | 42.6 | 38.4 |
| no addition | 38.5 | 32.4 |

TABLE 4a

Wash conditions

| | |
|---|---|
| Instrument | Launder-O-Meter (from Atlas, Chicago, USA) |
| Wash temperature | 25° C. |
| Polymer dosage | 25 mg/l |
| Laundry detergent | Model laundry detergent from surfactant 1/ surfactant 2 |
| Surfactant 1 dosage | 150 mg/l |
| Surfactant 2 dosage | 50 mg/l |
| Water hardness | 1.0 mmol/l Ca:Mg 3:1 |
| Liquor ratio | 12.5:1 |
| Wash time | 30 min |
| Test cloths | TG 3, TG 4, TG 6, TG 7 and TG 8<br>The soil cloths were each trimmed to 4 × 4 cm and stitched onto white cotton. In each case, 2 cotton fabrics with stitched-on TG 3, TG 4 and TG 6 cloth and also 2 cotton fabrics with stitched-on TG 7 and TG 8 cloth were washed together. A further 5 g of white cotton fabric were included in each wash. |

TABLE 4b

Wash results

| | Soil removal [%] | | | | |
|---|---|---|---|---|---|
| Polymer | TG 3 | TG 4 | TG 6 | TG 7 | TG 8 |
| from Example 3 | 29.7 | 8.2 | 48.1 | 6.6 | 3.9 |
| no addition | 29.4 | 6.8 | 47.4 | 5.9 | 2.5 |

TABLE 5a

Wash conditions

| | |
|---|---|
| Instrument | Launder-O-Meter (from Atlas, Chicago, USA) |
| Wash temperature | 25° C. |
| Polymer dosage | (1) 20 mg/l; (2) 40 mg/l |
| Laundry detergent | Tide liquid (Procter & Gamble) |
| Laundry detergent dosage | 1 g/l |
| Water hardness | 1.0 mmol/l Ca:Mg 3:1 |
| Liquor ratio | 12.5:1 |
| Wash time | 30 min |
| Test cloths | TG 3, TG 4, TG 5 and TG 6<br>The soil cloths were each trimmed to 4 × 4 cm and stitched onto white cotton. In each case 2 cotton fabrics with stitched-on soil cloth were washed together. A further 5 g of white cotton fabric were included in each wash. |

TABLE 5b

Wash results

| | Soil removal [%] | | | |
|---|---|---|---|---|
| Polymer | TG 3 | TG 4 | TG 5 | TG 6 |
| from Example 3 (20 mg/l) | 39.6 | 7.6 | 31.4 | 50.0 |
| from Example 3 (40 mg/l) | 40.2 | 8.2 | 32.1 | 50.6 |
| no addition | 37.2 | 5.4 | 28.5 | 44.4 |

The results of the wash tests show that adding the inventive alkoxylated polyalkylenimines leads to a distinct improvement in soil release with regard to fatty and oily stains from cotton fabric.

What is claimed is:

1. An amphiphilic water-soluble alkoxylated polyalkylenimine of formula I

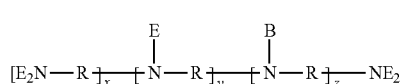

wherein
R are identical or different, linear or branched $C_2$-$C_6$-alkylene radicals;
B is a branch;

E is an alkylenoxy unit of the formula

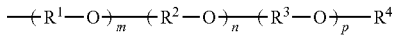

$R^1$ is 1,2-propylene, 1,2-butylene and/or 1,2-isobutylene;
$R^2$ is ethylene;
$R^3$ is 1,2-propylene;
$R^4$ are identical or different radicals: hydrogen; $C_1$-$C_4$-alkyl;
x, y, z are each from 2 to 150, where the sum of x+y+z is a number of alkylenimine units which corresponds to an average molecular weight $M_w$ of the polyalkylenimine, before the alkoxylation, of from 300 to 10 000;
m is a rational number from 0 to 2;
n is a rational number from 6 to 18;
p is a rational number from 3 to 12, where $0.8 \leq n/p \leq 1.0 (x+y+z)^{1/2}$;
and quaternization products thereof.

2. The alkoxylated polyalkylenimine according to claim 1 wherein R is ethylene.

3. The alkoxylated polyalkylenimine according to claim 1 wherein $R^4$ is hydrogen.

4. The alkoxylated polyalkylenimine according to claim 1 wherein n is a rational number from 7 to 15 and p is a rational number from 4 to 10 where $0.9 \leq n/p \leq 0.8(x+y+z)^{1/2}$.

5. The alkoxylated polyalkylenimine according to claim 1 wherein n is a rational number from 8 to 12 and p is a rational number from 5 to 8 where $1.0 \leq n/p \leq 0.6(x+y+z)^{1/2}$.

6. The alkoxylated polyalkylenimine according to claim 1 wherein the sum of x+y+z is a number of alkylenimine units which corresponds to an average molecular weight $M_w$ of the polyalkylenimine before the alkoxylation of from 500 to 7500.

7. The alkoxylated polyalkylenimine according to claim 1 wherein the sum of x+y+z is a number of alkylenimine units which corresponds to an average molecular weight $M_w$ of the polyalkylenimine before the alkoxylation of from 1000 to 6000.

8. The alkoxylated polyalkylenimine according to claim 1 in which up to 50% of the nitrogen atoms present are quaternized.

9. The alkoxylated polyalkylenimine according to claim 1 wherein m is 0.

* * * * *